United States Patent
Yu et al.

(10) Patent No.: US 11,463,178 B2
(45) Date of Patent: Oct. 4, 2022

(54) SUB-BAND SELECTION ACTIVATION-BASED MULTI-BAND HYPERBOLIC FREQUENCY MODULATION SPREAD SPECTRUM UNDERWATER ACOUSTIC COMMUNICATION METHOD

(71) Applicant: SOUTH CHINA UNIVERSITY OF TECHNOLOGY, Guangdong (CN)

(72) Inventors: Hua Yu, Guangdong (CN); Yongjin Zhou, Guangdong (CN); Fei Ji, Guangdong (CN); Fangjiong Chen, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 281 days.

(21) Appl. No.: 16/765,029

(22) PCT Filed: Nov. 19, 2018

(86) PCT No.: PCT/CN2018/116144
§ 371 (c)(1),
(2) Date: May 18, 2020

(87) PCT Pub. No.: WO2019/101032
PCT Pub. Date: May 31, 2019

(65) Prior Publication Data
US 2020/0366382 A1    Nov. 19, 2020

(30) Foreign Application Priority Data
Nov. 22, 2017    (CN) .......................... 201711170818.8

(51) Int. Cl.
*H04B 1/69*    (2011.01)
*H04B 11/00*    (2006.01)
(Continued)

(52) U.S. Cl.
CPC ............... *H04B 11/00* (2013.01); *H04B 1/69* (2013.01); *H04B 13/02* (2013.01);
(Continued)

(58) Field of Classification Search
CPC ............ H04L 27/2627; H04L 27/2649; H04L 27/2695; H04B 13/02; H04B 11/00; H04B 1/69
(Continued)

(56) References Cited

U.S. PATENT DOCUMENTS 5,784,339 A * 7/1998 Woodsum ............... H04B 11/00
367/134

FOREIGN PATENT DOCUMENTS

CN    102170314 A    2/2011
CN    102571677 A    7/2012
(Continued)

*Primary Examiner* — Rahel Guarino
(74) *Attorney, Agent, or Firm* — Eschweiler & Potashnik, LLC

(57) ABSTRACT

Disclosed by the present invention is a sub-band selection activation-based multi-band hyperbolic frequency modulation spread spectrum underwater acoustic communication method. The present invention discloses: dividing the available bandwidth of an underwater acoustic system into a plurality of sub-bands, performing hyperbolic frequency modulation on each of the sub-bands respectively, and performing spread spectrum modulation on the plurality of sub-bands within the same frequency modulation period, thus implementing multi-band parallel transmission. Hence, within each frequency modulation period, the divided plurality of sub-bands is grouped, and each sub-band group activates different sub-bands for transmission according to different options for transmitting data. Compared to other underwater acoustic hyperbolic frequency modulation communication solutions, the present invention further improves
(Continued)

the frequency band utilization of the system, and the energy efficiency is also improved.

7 Claims, 2 Drawing Sheets

(51) Int. Cl.
*H04B 13/02* (2006.01)
*H04L 27/26* (2006.01)

(52) U.S. Cl.
CPC ...... *H04L 27/2627* (2013.01); *H04L 27/2649* (2013.01); *H04L 27/2695* (2013.01)

(58) Field of Classification Search
USPC .......................................................... 367/131
See application file for complete search history.

(56) References Cited

FOREIGN PATENT DOCUMENTS

| | | | |
|---|---|---|---|
| CN | 103944848 A | 7/2014 | |
| CN | 201410266051 A | 2/2016 | |
| WO | 2005055442 A2 | 6/2005 | |
| WO | 2019101032 A1 | 5/2019 | |

* cited by examiner

SUB-BAND SELECTION ACTIVATION-BASED MULTI-BAND HYPERBOLIC FREQUENCY MODULATION SPREAD SPECTRUM UNDERWATER ACOUSTIC COMMUNICATION METHOD

CROSS-REFERENCE TO RELATED APPLICATIONS

This application is a national stage entry application of PCT/CN2018/116144, filed on Nov. 19, 2018, which in turn claimed the benefit of priority to Chinese application CN201711170818.8 filed on Nov. 22, 2017.

TECHNICAL FIELD

The present invention relates to the field of underwater acoustic communication, and in particular to a sub-band selection activation-based multi-band hyperbolic frequency modulation spread spectrum underwater acoustic communication method.

BACKGROUND ART

Underwater acoustic channels have their particularity and complexity, which is reflected in their severe multipath effects, time-varying characteristics, and band-limited characteristics. Underwater acoustic coherent communication that continuously develops in recent years has more obvious advantages over non-coherent communication in improving frequency band utilization and an information transmission rate. However, severe multipath and time-varying properties are the main limiting factors for the underwater acoustic coherent communication, and meanwhile, it is relatively difficult to ensure the reliability of communication in an environment with a relatively low signal-to-noise ratio.

The spread spectrum (SS) technology is a technology that can effectively resist interference, and in the environment of severe channel multipaths, it is required that a communication system has a relatively strong robustness, and in this case, a manner of using spread spectrum communication is a better choice. Traditional spread spectrum manners comprise direct sequence spread spectrum, frequency hopping spread spectrum, time hopping spread spectrum, hybrid spread spectrum, etc. Subsequently, some people have proposed linear frequency modulation spread spectrum and hyperbolic frequency modulation spread spectrum. In the present invention, a hyperbolic frequency modulation signal is selected as a spread spectrum signal. As an underwater acoustic spread spectrum communication manner, the hyperbolic frequency modulation has its unique advantages.

To facilitate the understanding of subsequent algorithms, the hyperbolic frequency modulation signal model is shown as follows:

a hyperbolic frequency modulation (HFM) signal can be defined as $$x(t) = \exp\left(j\frac{2\pi}{k}\ln(1+kf_0 t)\right), 0 \le t \le T$$

where $$k = \frac{B}{Tf_0 f_1}$$

where represents a frequency modulation rate, B represents a bandwidth (a frequency modulation interval), $f_0$ represents a starting frequency, $f_1 = f_0 + B$ represents an ending frequency, and T represents the duration of period of the HFM signal. The instantaneous frequency of the HFM signal is the derivative of its phase with respect to time, and $$f(t) = \frac{1}{kt + f_0^{-1}}$$

This is a hyperbolic function with respect to time t and the signal is therefore referred to as a hyperbolic frequency modulation signal. The hyperbolic frequency modulation signal has good pulse compressibility and Doppler tolerance. Its pulse compressibility is reflected in that after undergoing matched filtering, a received signal can form a pulse with a sharp main lobe and a rapidly weakened side lobes, so it has good anti-noise performance. Meanwhile, in the process of signal transmission, because a relative movement may cause a Doppler effect, the signal would be compressed or spread in time. After the signal has undergone the Doppler effect, a pulse can still be formed well at a receiving end after matched filtering; thus, it is considered that the signal has Doppler tolerance.

For an HFM signal, it is assumed that it undergoes Doppler spread or compression with a scale of α. A received HFM signal can be expressed as $$r(t) = x(\alpha t) = \exp\left(j\frac{2\pi}{k}\ln(k\alpha t + f_0^{-1})\right)$$

In this case, the instantaneous frequency of the signal becomes $$f'(t) = \frac{\alpha}{k\alpha t + f_0^{-1}}$$

Here, we can find a suitable Δt, so that f'(t−Δt)=f(t), that is, $$\frac{1}{kt + f_0^{-1}} = \frac{\alpha}{k\alpha(t-\Delta t) + f_0^{-1}}$$

$$\Delta t = \frac{1-\alpha}{\alpha k f_0}$$

It can be seen that the delay Δt is a time-independent constant determined by a scale factor; in this way, after undergoing the Doppler effect, the HFM signal is only shifted in time; as such, a good pulse can still be formed after matched filtering at the receiving end, but the position of the pulse would be shifted by Δt; therefore, the HFM signal has Doppler tolerance.

Although the use of HFM for spread spectrum communication can enhance the capabilities of anti-interference and anti-Doppler effect, a rather severe problem that is faced is that the frequency band utilization is relatively low; therefore, how to improve the frequency band utilization of HFM spread spectrum communication is worthy of studying.

A hyperbolic frequency modulation spread spectrum communication solution combining multi-band transmission and carrier combination according to the present invention is proposed based on the signal model and background mentioned above.

SUMMARY OF THE INVENTION

The object of the present invention is to propose a sub-band selection activation-based multi-band hyperbolic frequency modulation spread spectrum underwater acoustic communication method based on HFM signals, wherein by extending single-band transmission to multi-band transmission, and meanwhile, grouping a plurality of sub-bands within a frequency modulation period with each sub-band group selecting to activate different sub-bands for transmission, so as to form different sub-band combination solutions for carrying information, thereby improving frequency band utilization.

For general HFM spread spectrum communication solutions, the available bandwidth of a system is used for a single HFM frequency modulation signal, and within each frequency modulation period, the frequency modulation signal is used for spread spectrum modulation to carry information; as such, the frequency band utilization of the system is relatively low.

The object of the present invention is achieved by the following technical solution.

A sub-band selection activation-based multi-band hyperbolic frequency modulation spread spectrum underwater acoustic communication method mainly comprises the following steps:

S1, dividing the bandwidth of a communication system into a plurality of sub-bands, and performing hyperbolic frequency modulation respectively;

S2, grouping data and sub-bands, determining a sub-band activation solution, and performing modulation on a signal;

S3, adding a frame header to the signal after modulation;

S4, performing, at a receiving end, preprocessing, synchronization, and channel estimation on a received signal;

S5, calculating correlation values required for sub-band detection and demodulation;

S6, detecting an activated sub-band; and

S7, demodulating the activated sub-band.

The above-mentioned method specifically includes the following steps:

S1, dividing the available bandwidth $B=f_1-f_0$ of the system (the highest frequency−the lowest frequency) into K sub-bands firstly, the bandwidth of each of the sub-bands being $$\frac{B}{K},$$

and performing hyperbolic frequency modulation on each of the sub-bands respectively for subsequent use in spread spectrum modulation. A hyperbolic frequency modulation signal corresponding to the $k(1 \le k \le K)$ th sub-band is $$x[n] = \exp\left(j\frac{2\pi}{\alpha_k}\ln\left(1+\alpha_k f_{k0}\frac{n}{f_s}\right)\right), n = 0, \ldots, N-1$$

where $f_s$ is the sampling rate, $$N = f_s T, \alpha_k = -\frac{B}{f_{k0}(Kf_{k0}+B)T}$$

and $f_{k0} = f_0 + (k-1)\frac{B}{K}.$

S2, determining a sub-band activation solution, and performing modulation on a signal. Every K bits in sent data are used to modulate one multi-band hyperbolic frequency modulation spread spectrum symbol. Every K bits are grouped into Q groups to correspond to Q sub-band groups, each group having two bits. The two bits in each group are used to control the activation of the group of sub-band carriers and the modulation of each of the activated sub-band carriers, and the activation solution is as follows:

activating, when the first bit of the two bits in each group is 0, the first sub-band in each group for transmission, and activating, when that bit is 1, the second sub-band in the group for transmission;

using BPSK symbol mapping for the second bit of the two bits in each group to modulate a carrier signal of the activated sub-band; and denoting two bits in the j (j=1, ..., Q) th group as $b_{j1}b_{j2}$, then a sending signal of a current multi-band hyperbolic frequency modulation spread spectrum symbol frame being expressed as $$s[n] = \sum_{j=1}^{Q}(2b_{j2}-1)x_{k_j}[n]$$

$$n = 0, \ldots, N-1$$

where $k_j=2j+b_{j1}-1$ is the number of an activated sub-band in the jth group, and in the above formula, $2b_{j2}-1$ represents that BPSK symbol mapping is used for the second bit in the jth group.

S3, adding a frame header. A frame header is added to the signal after spread spectrum modulation. The frame header uses an LFM signal, and an entire signal frame consists of a frame header, a guard interval, and data, wherein the length of each part can be adjusted according to actual requirements. Then, after DA conversion and analog transmission front-end power amplification, it is transmitted in an underwater acoustic channel.

S4, a receiving end performing preprocessing on a received signal. Band pass filtering is performed first, and then the frame header is used for synchronization and channel estimation; the present invention does not specifically discuss the synchronization and channel estimation, and general synchronization and channel estimation algorithms may be used.

It is assumed that the expression for a synchronized signal is r[n], and a result after the channel estimation is: the number of multipaths is L, and parameters corresponding to each path are an amplitude $\hat{A}_l$, a delay $\hat{\tau}_l$, and a Doppler factor $\hat{\beta}_l$.

S5, calculating correlation values required for sub-band activation detection and demodulation.

S51, calculating a correlation peak offset. The peak offset for each path is calculated respectively based on the channel estimation parameters in S4. For the m(1, ..., M) th symbol in a data frame, the peak offset for the l(1, ..., L) th path $\Delta n_{k,m,l}$ thereof is $$\Delta n_{k,m,l} = \left\lfloor \hat{\tau}_l^* f_s + \left(\frac{1-\hat{\beta}_l}{\hat{\beta}_l \alpha_k f_{k0}}\right)*f_s + (m-1)*\frac{N}{\hat{\beta}_l} \right\rfloor$$

$$m = 1, \ldots, M, l = 1, \ldots, L$$

where $$\frac{1-\hat{\beta}_l}{\hat{\beta}_l \alpha_k f_{k0}}$$

is a shift caused by Doppler spread, $f_{k0}$ represents the starting frequency of the k th sub-band, and $$\frac{N}{\hat{\beta}_l}$$

is the number of points of a hyperbolic frequency modulation symbol after Doppler spread compensation.

S52, performing a correlation operation to obtain a peak value. Based on $\Delta n_{k,m,l}$, each sub-band $x_k[n]$ and a corresponding position of r[n] are respectively used to perform a correlation operation so as to obtain a peak value. For each data frame, the peak value $I_{k,m,l}$ for the k th sub-band, the m th symbol, and the l th path can be expressed as $$I_{k,m,l} = \sum_{n=0}^{N-1} x_k[n] r[n + \Delta n_{k,m,l}]$$

S6, detecting an activated sub-band. A decision is made on the activated sub-band according to the correlation peak value $I_{k,m,l}$ obtained in S5, and for any m th symbol in the data frame, the decision criterion for the jth group (j=1, . . . , Q) of activated sub-bands is as follows:
if $$\sum_{l=1,\ldots,L} |I_{2j-1,m,l}| > \sum_{l=1,\ldots,L} |I_{2j,m,l}|,$$

the first sub-band in the sub-band group is considered as an activated sub-band, and meanwhile, according to a modulation regulation in S2, it may be determined that $\hat{b}_{j1}=0$ in symbols correspondingly transmitted by the sub-band group, and the number of an activated sub-band in the jth group is $k_j=2j$.
If $$\sum_{l=1,\ldots L} |I_{2j-1,m,l}| \leq \sum_{l=1,\ldots L} |I_{2j,m,l}|,$$

the second sub-band in the sub-band group is considered as an activated sub-band, and meanwhile, according to a modulation regulation in S2, it may be determined that $\hat{b}_{j1}=1$ in symbols correspondingly transmitted by the sub-band group, and the number of an activated sub-band in the jth group is $k_j=2j$.

S7, demodulating the activated sub-band. The demodulation of symbols transmitted on the j-th group (j=1, . . . ,Q) of activated sub-band uses a maximum merge ratio criterion to perform merge processing on the correlation peak values of L paths and make a sign decision:

$$S_{j2} = \text{sign}\left(\text{Re}\left\{\sum_{l=1}^{L} \hat{A}_l^* I_{k_j,m,l}\right\}\right)$$

then performing BPSK symbol demapping $$\hat{b}_{j2} = \frac{S_{j2}+1}{2}$$

Since then, the de-spreading of the jth sub-band group is completed, and the demodulation of the two symbols $b_{j1} b_{j2}$ transmitted by the sub-band group is achieved.

Compared with the prior art, the present invention has the following advantages and technical effects:

1. the available bandwidth of the system is divided into a plurality of sub-bands for data transmission, which improves the frequency band utilization of the entire system; and 2. with the manner of selecting a sub-band to be activated, the sequence number of the non-activated sub-band also transmits information, which reduces the energy consumption of the system on the premise of transmitting the same amount of data.

DETAILED DESCRIPTION OF EMBODIMENTS

In order to make the objectives, technical solutions, and advantages of the present invention clearer and more specific, the present invention is further described in detail below with reference to the accompanying drawings and embodiments. It is to be understood that the specific embodiments described herein are merely illustrative of the present invention and are not intended to limit the present invention.

Figure 1:
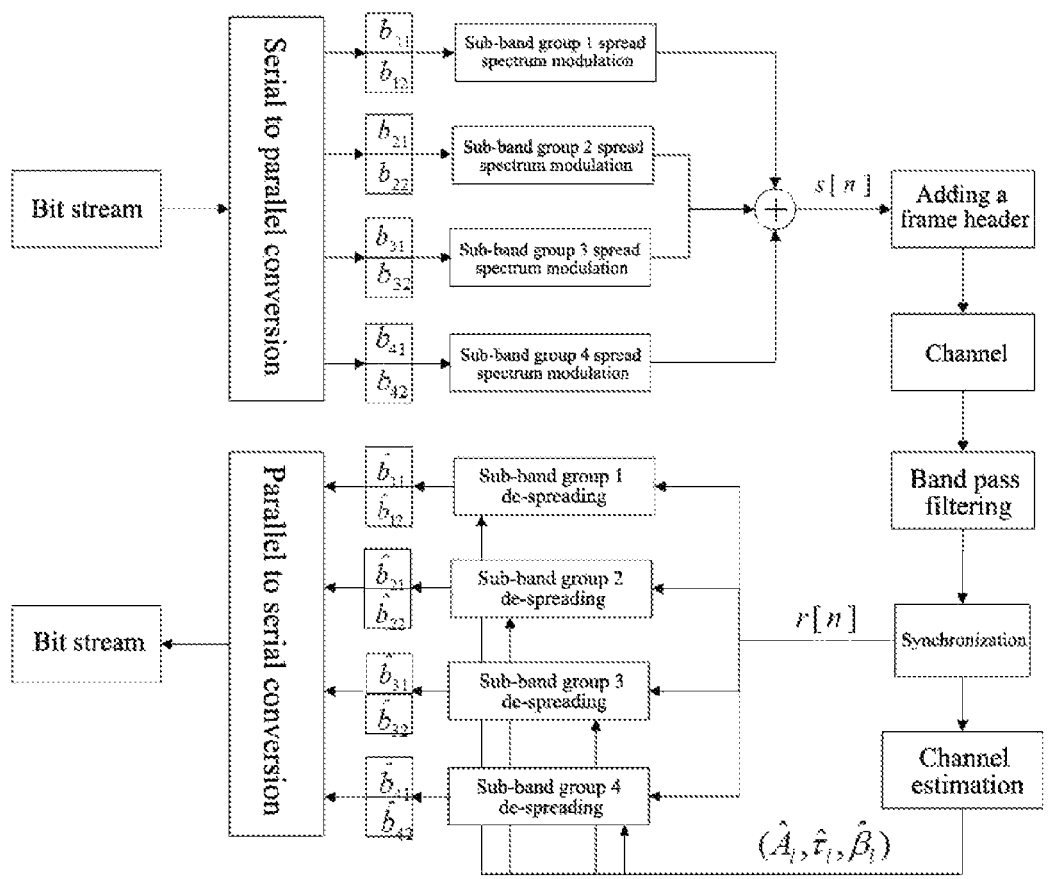
FIG. 1 is a schematic structural diagram of an underwater acoustic hyperbolic frequency modulation spread spectrum communication solution combining multi-band transmission and carrier combination according to the present invention.
Figure 2:
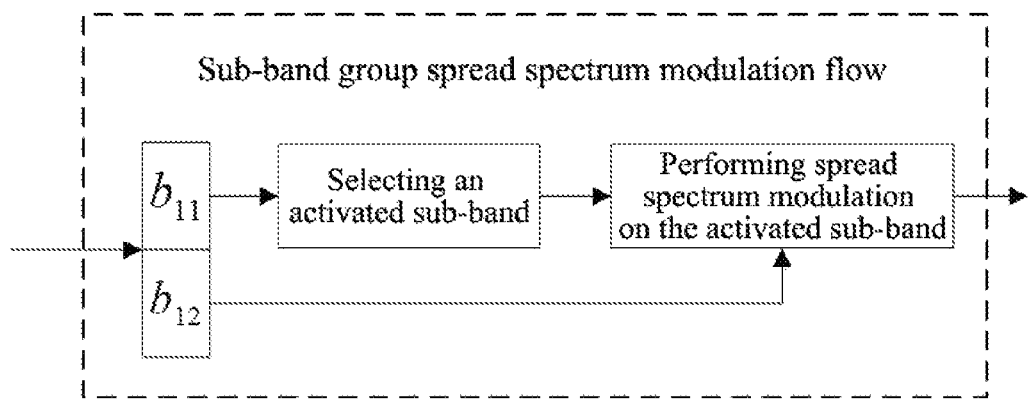
FIG. 2 is a flowchart of sub-band group spread spectrum modulation with a first sub-band group as an example.
Figure 3:
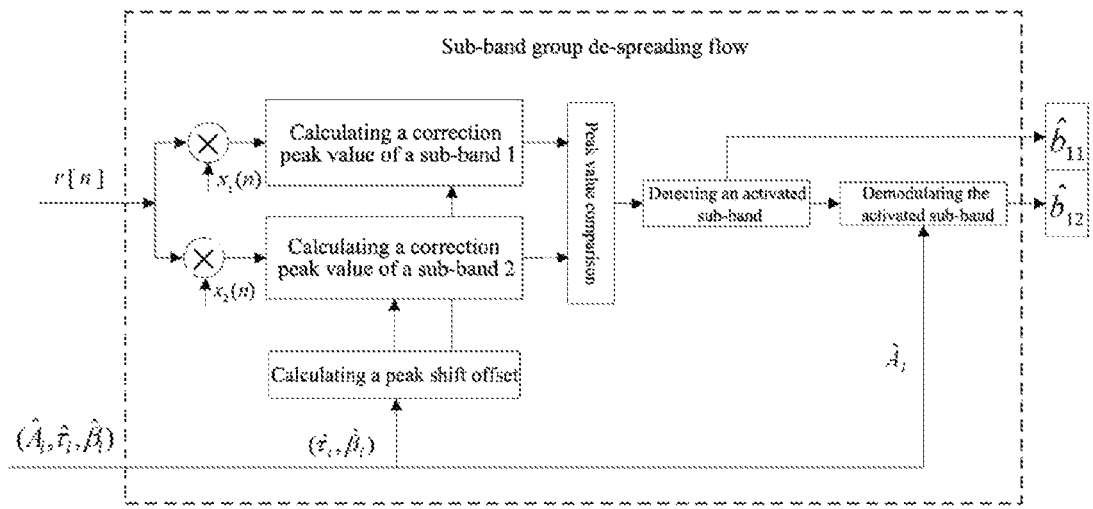
FIG. 3 is a flowchart of sub-band group de-spreading with a first sub-band group as an example.

With reference to FIG. 1, FIG. 1 is a schematic diagram of a system structure of the present invention.

Meanings of various reference signs are as follows:

B: bandwidth, where B=6 KHz in this example.

$f_0$: the starting frequency of the bandwidth, where $f_0$=9 KHz in this example.

$f_1$: the ending frequency of the bandwidth, where $f_1$=15 KHz in this example.

$T_H$: the symbol period of a hyperbolic frequency modulation signal, where $T_H$=10 ms in this example.

$T_G$: nil symbol guard interval cycle, where $T_G$=20 ms in this example.

$T_L$: LFM frame header duration, where $T_L$=20 ms in this example.

$f_s$: the sampling rate of the hyperbolic frequency modulation signal, where $f_s$=100 KHz in this example.

N: the number of sampling points of the hyperbolic frequency modulation signal within a period, $N=T_H*f_s$, where $N=1000$ in this example.

$\alpha_k$: the frequency modulation rate of the hyperbolic frequency modulation signal.

$f_{k0}$: representing the starting frequency of the k th sub-band.

K: the number of sub-bands, where K=8 in this example.

Q: the sub-bands being grouped into Q groups, where Q=4 in this example.

M: the number of multi-band hyperbolic frequency modulation symbols contained in each frame of signal, where M=10 in this example.

In this embodiment, an underwater acoustic hyperbolic frequency modulation spread spectrum communication solution combining multi-band transmission and carrier combination comprises the following steps:

S1, generating and grouping hyperbolic frequency modulation spread spectrum sub-band carrier signals. $B=f_1-f_0$ is divided into K=8 sub-bands, the bandwidth for each of the sub-bands is $$\frac{B}{K},$$

and hyperbolic frequency modulation is performed on each of the sub-bands respectively for spread spectrum modulation. A hyperbolic frequency modulation carrier signal corresponding to the $k(k=1, \ldots, K)$ th sub-band is $$x_k[n] = \exp\left(j\frac{2\pi}{\alpha_k}\ln\left(1 + \alpha_k f_{k0}\frac{n}{f_s}\right)\right), n = 0, \ldots, N-1, k = 1, \ldots, K, \quad (1)$$

where $$\alpha_k = -\frac{B}{f_{k0}(Kf_{k0} + B)T_H}$$

is the hyperbolic frequency modulation rate of the kth sub-band, and $$f_{k0} = f_0 + (k-1)\frac{B}{K}$$

is the starting frequency of the k th sub-band.

Meanwhile, K sub-bands are grouped into Q=4 groups, each group having two sub-bands.

S2, signal modulation. Every K bits in sent data are used to modulate one multi-band hyperbolic frequency modulation spread spectrum symbol. Every K bits are grouped into Q groups to correspond to Q sub-band groups, each group having two bits. The two bits in each group are used to control the activation of the group of sub-band carriers and the modulation of each of the activated sub-band carriers, and a specific implementation is as follows:

activating, when the first bit of the two bits in each group is 0, the first sub-band in each group for transmission, and activating, when that bit is 1, the second sub-band in the group for transmission;

using BPSK symbol mapping for the second bit of the two bits in each group to modulate a carrier signal of the activated sub-band; and denoting two bits in the j (j=1, ..., Q) th group as $b_{j1}b_{j2}$, then a sending signal of a current multi-band hyperbolic frequency modulation spread spectrum symbol frame being expressed as $$s[n] = \sum_{j=1}^{Q}(2b_{j2}-1)x_{k_j}[n] \; n = 0, \ldots, N-1 \quad (2)$$

where $k_j=2j+b_{j1}-1$ is the number of an activated sub-band in the jth group, and in the above formula, $2b_{j2}-1$ represents that BPSK symbol mapping is used for the second bit in the jth group.

The above-mentioned signal modulation manner is used to modulate M multi-band hyperbolic frequency modulation symbols to form one frame of signal.

S3, adding a frame header. A frame header is added to the signal after spread spectrum modulation. The frame header uses an LFM signal, and the LFM signal can be expressed as $$c[n] = \cos\left(2\pi f_0 n + \pi\frac{f_1-f_0}{T}n^2\right) n = 0, \ldots, N_L-1 \quad (3)$$

where $N_L=T_L*f_s$.

Figure 4:
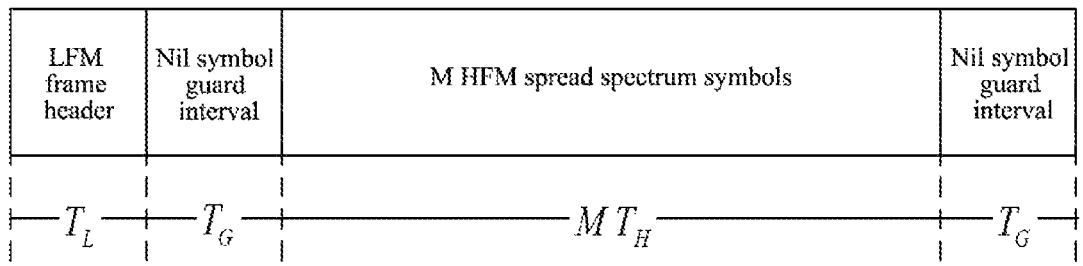
FIG. 4 is a structural diagram of a signal frame.

The structure of the signal frame is shown in FIG. 4, and $T_L$, $T_G$, and $T_H$ all can be adjusted according to actual requirements. After DA conversion and analog transmission front-end power amplification, the above-mentioned data frame is transmitted in an underwater acoustic channel.

S4, receiving preprocessing. After the signal undergoes multipath and Doppler effects in the underwater acoustic channel, at the receiving end, band pass filtering is performed first, and then the frame header is used for synchronization and channel estimation; the present invention does not specifically discuss the synchronization and channel estimation, and general synchronization and channel estimation algorithms may be used. The received signal that has been synchronized is denoted as r[n], and it is assumed that a result after the channel estimation is that the number of multipaths is L, and parameters corresponding to each path are an amplitude $\hat{A}_l$, a delay $\hat{\tau}_l$, and a Doppler factor $\hat{\beta}_l$.

S5, calculating correlation values for sub-band detection and demodulation. Here, the first sub-band group is taken as an example.

S51, calculating a correlation peak offset. The peak offset for each path is calculated respectively based on the channel estimation parameters in S4. For the m(1, ..., M) th symbol in a data frame, the peak offset for the l(1, ..., L) th path thereof should be $$\Delta n_{k,m,l} = \left\lfloor \hat{\tau}_l * f_s + \left(\frac{1-\hat{\beta}_l}{\hat{\beta}_l \alpha_k f_{k0}}\right)*f_s + (m-1)*\frac{N}{\hat{\beta}_l}\right\rfloor k=1,\ldots,Q \quad (4)$$

where $$\frac{1-\hat{\beta}_l}{\hat{\beta}_l \alpha_k f_{k0}}$$

is a shift caused by Doppler spread, $f_{k0}$ represents the starting frequency of the k th sub-band, and $$\frac{N}{\hat{\beta}_l}$$

is the number of points of a hyperbolic frequency modulation symbol after Doppler spread compensation.

S52, performing a correlation operation to obtain a peak value. Based on $\Delta n_{k,m,l}$, the hyperbolic frequency modulation carrier signal $x_k[n]$ of each sub-band and a corresponding position of a received signal r[n] are respectively used to perform a correlation operation so as to obtain a peak value. For each data frame, the peak value $I_{k,m,l}$ for the k th sub-band, the m th symbol, and the l th path can be expressed as $$I_{k,m,l} = \sum_{n=0}^{N-1} x_k[n] r[n + \Delta n_{k,m,l}] \quad (5)$$

S6, detecting an activated sub-band. A decision is made on the activated sub-band according to the correlation peak value $I_{k,m,l}$ obtained in S5, and for any m th symbol in the data frame, the decision criterion for the activated sub-band is as follows (here, the first sub-band group is taken as an example).

If $$\sum_{l=1,\ldots,L} |I_{1,m,l}| > \sum_{l=1,\ldots,L} |I_{2,m,l}|,$$

the activated sub-band in the sub-band group is considered as the first sub-band, and meanwhile, according to a modulation regulation in S2, it may be determined that $\hat{b}_{11}=0$ in symbols correspondingly transmitted by the sub-band group.

If $$\sum_{l=1,\ldots L} |I_{1,m,l}| \le \sum_{l=1,\ldots L} |I_{2,m,l}|,$$

the activated sub-band in the sub-band group is considered as the second sub-band, and meanwhile, according to a modulation regulation in S2, it may be determined that $\hat{b}_{11}=1$ in symbols correspondingly transmitted by the sub-band group.

S7, demodulating the activated sub-band. The sequence number k of the activated sub-band is determined according to the result of the detection in S6, and symbol demodulation is performed on the sub-band. Here, a maximum merge ratio criterion is used to perform merge processing on the peak values of L paths and make a sign decision $$S_{12} = \text{sign}\left(\text{Re}\left\{\sum_{l=1}^{L} \hat{A}_l^* I_{k,m,l}\right\}\right) \quad (6)$$

then performing BPSK symbol demapping $$\hat{b}_{12} = \frac{S_{12}+1}{2} \quad (7)$$

Since then, the de-spreading of a sub-band group is completed, and the demodulation of the two symbols $b_{11}b_{12}$ transmitted by the sub-band group is achieved. The remaining sub-band groups are processed accordingly.

Figure 5:
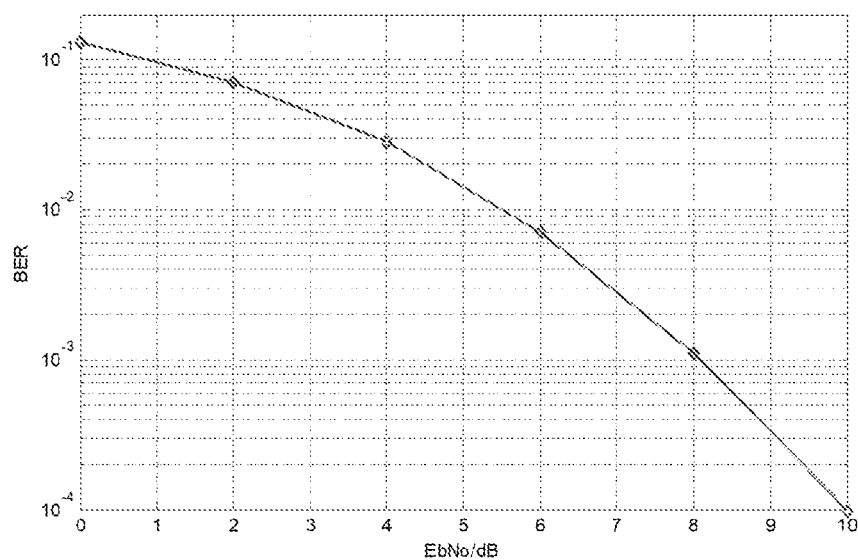
FIG. 5 is a simulation diagram of a bit error rate of a specific embodiment.

In the present invention, the available bandwidth of the system is divided into a plurality of sub-bands for data transmission, which improves the frequency band utilization of the entire system. With the manner of selecting a sub-band to be activated, the energy consumption of the system is reduced on the premise of transmitting the same amount of data. It can also be seen from a simulation diagram of a bit error rate in FIG. 5 that, in this embodiment, after undergoing Doppler spread, the signal can still maintain a relatively good bit error rate (BER) performance at a relatively low signal-to-noise ratio (SNR), and with the manner of selecting a sub-carrier to be activated, an energy loss and interference between adjacent carriers are reduced.

The invention claimed is:

1. A sub-band selection activation-based multi-band hyperbolic frequency modulation spread spectrum underwater acoustic communication method, comprising the following steps:
   S1, dividing a bandwidth of a communication system into a plurality of sub-bands, and performing hyperbolic frequency modulation respectively;
   S2, grouping data and sub-bands, determining a sub-band activation series of steps, and performing modulation on a signal;
   S3, adding a frame header to the signal after modulation;
   S4, performing, at a receiving end, preprocessing, synchronization, and channel estimation on a received signal;
   S5, calculating correlation values for sub-band detection and demodulation;
   S6, detecting an activated sub-band; and
   S7, demodulating the activated sub-band.

2. The sub-band selection activation-based multi-band hyperbolic frequency modulation spread spectrum underwater acoustic communication method of claim 1, wherein in step S1, an available bandwidth $B=f_1-f_0$ of the system, which is a difference between a highest frequency $f_1$ and a lowest frequency $f_0$, is divided into K sub-bands, and a value of K is an integer multiple of 2; the bandwidth of each of the sub-bands is $$\frac{B}{K},$$

hyperbolic frequency modulation is performed on each of the sub-bands respectively with a frequency modulation period being T, for subsequent use in spread spectrum modulation; and a hyperbolic frequency modulation signal corresponding to a k$(1 \le k \le K)$th sub-band is:

$$x_k[n] = \exp\left(j\frac{2\pi}{\alpha_k} \ln\left(1 + \alpha_k f_{k0}\frac{n}{f_s}\right)\right), n = 0, \ldots, N-1$$

where $f_s$ is a sampling rate, $$N = f_s T, \; \alpha_k = -\frac{B}{f_{k0}(Kf_{k0} + B)T} \text{ and } f_{k0} = f_0 + (k-1)\frac{B}{K}.$$

3. The sub-band selection activation-based multi-band hyperbolic frequency modulation spread spectrum underwater acoustic communication method of claim 1, wherein in step S2, the data and sub-bands are grouped, and the grouping is specifically:
   grouping every K bits into Q data groups, a value of Q being a number of the sub-bands divided by 2, i.e.

$$\frac{K}{2},$$

and meanwhile, also grouping the K sub-bands into Q sub-band groups, each of the data groups and each of the sub-band groups being corresponding to each other and forming as one group, wherein a result of the grouping is that two sub-bands in each group transmit two bits.

4. The sub-band selection activation-based multi-band hyperbolic frequency modulation spread spectrum underwater acoustic communication method of claim 1, wherein in step S2, determining the sub-band activation series of steps, and performing modulation on the signal are specifically:
   activating, when a first bit of the two bits in each group is 0, a first sub-band in each group for transmission, and activating, when that bit is 1, a second sub-band in the group for transmission;
   using BPSK symbol mapping for a second bit of the two bits in each group to modulate a carrier signal of the activated sub-band; and
   denoting two bits in a j(j=1, ..., Q)th group as $b_{j1}b_{j2}$, then a sending signal of a current multi-band hyperbolic frequency modulation spread spectrum symbol frame being expressed as $$s[n] = \sum_{j=1}^{Q} (2b_{j2} - 1)x_{k_j}[n] \;\; n = 0, \ldots, N-1$$

where $k_j = 2j + b_{j1} - 1$ is a number of an activated sub-band in the jth group, and $2b_{j2} - 1$ represents that BPSK symbol mapping is used for the second bit in the jth group.

5. The sub-band selection activation-based multi-band hyperbolic frequency modulation spread spectrum underwater acoustic communication method of claim 1, wherein in step S5, implementing an operation of correlation values for sub-band detection and demodulation includes:
   S51, calculating a correlation peak offset, and assuming that a result of the channel estimation in step S4 is that: a number of multipaths is L, and parameters corresponding to each path are a delay $\hat{\tau}_l$ and a Doppler factor $\hat{\beta}_l$; and calculating a peak offset for a k th sub-band, an m th symbol, and an i th path $$\Delta n_{k,m,l} = \left\lfloor \hat{\tau}_l * f_s + \left(\frac{1 - \hat{\beta}_l}{\hat{\beta}_l \alpha_k f_{k0}}\right) * f_s + (m-1) * \frac{N}{\hat{\beta}_l} \right\rfloor$$

where N is a number of points of a hyperbolic frequency modulation symbol; and $f_s$ is a signal sampling rate, $$\frac{1 - \hat{\beta}_l}{\hat{\beta}_l \alpha_k f_{k0}}$$

is a shift caused by Doppler spread, $f_{k0}$ represents a starting frequency of the kth sub-band, and $$\frac{N}{\hat{\beta}_l}$$

is a number of points of a hyperbolic frequency modulation symbol after Doppler spread compensation; and
   S52, performing a correlation operation to obtain a peak value; based on $\Delta n_{k, m, l}$, respectively using each sub-band and a corresponding position of a received signal to perform the correlation operation so as to obtain the peak value; and the peak value $I_{k, m, l}$ for the kth sub-band, the mth symbol, and the ith path being expressed as $$I_{k,m,l} = \sum_{n=0}^{N-1} x_k[n]r[n + \Delta n_{k,m,l}]$$

where $x_k[n]$ is a spread spectrum symbol of the kth sub-band, and r[n] represents a signal at the receiving end.

6. The sub-band selection activation-based multi-band hyperbolic frequency modulation spread spectrum underwater acoustic communication method of claim 5, wherein in S6, letting j=1, ..., Q, a detection of a jth group of activated sub-bands includes:
   if $$\sum_{l=1,\ldots L} |I_{2j-1,m,l}| > \sum_{l=1,\ldots L} |I_{2j,m,l}|,$$

a first sub-band in the sub-band group is considered as the activated sub-band, and meanwhile, according to the modulation of step S2, it may be determined that $\hat{\beta}_{jl} = 0$ in symbols correspondingly transmitted by the sub-band group, and the number of the activated sub-band is $k_j = 2j - 1$; and
   if $$\sum_{l=1,\ldots L} |I_{2j-1,m,l}| \leq \sum_{l=1,\ldots L} |I_{2j,m,l}|,$$

a second sub-band in the sub-band group is considered as the activated sub-band, and meanwhile, according to a modulation regulation in S2, it can be determined that $\hat{\beta}_{jl} = 1$ in symbols correspondingly transmitted by the sub-band group, and the number of the activated sub-band is $k_j = 2j$.

7. The sub-band selection activation-based multi-band hyperbolic frequency modulation spread spectrum underwater acoustic communication method of claim 1, wherein in S7, letting j=1, ..., Q, and the demodulation of symbols transmitted on a jth group of activated sub-bands is specifically implemented as follows:
   a maximum merge ratio criterion is used to perform merge processing on correlation peak values of L paths and make a sign decision, $$S_{j2} = \text{sign}\left(\text{Re}\left\{\sum_{l=1}^{L} \hat{A}_l^* I_{k_j,m,l}\right\}\right)$$

where $\hat{A}_l$ is an estimated amplitude of an lth path, and then BPSK symbol demapping is performed, that is, $$\hat{b}_{j2} = \frac{S_{j2} + 1}{2}.$$

* * * * *